Feb. 10, 1931.  L. ROSSI  1,792,038
LEAF SPRING SUSPENSION FOR VEHICLES
Filed Oct. 19, 1928  2 Sheets-Sheet 1

Inventor
Luigi Rossi,
By Henry Orth
Atty

Patented Feb. 10, 1931

1,792,038

UNITED STATES PATENT OFFICE

LUIGI ROSSI, OF TURIN, ITALY

LEAF-SPRING SUSPENSION FOR VEHICLES

Application filed October 19, 1928, Serial No. 313,520, and in Italy October 31, 1927.

This invention relates to that type of leaf spring suspension for vehicles, in which the spring ends are held in rubber blocks contained in cases supported from the vehicle frame, the bearing surfaces whereof reduce the length of the flexible portion of the spring as the load increases.

The purpose of the invention is to provide a resilient suspension on leaf springs, in which bearing surfaces are provided also under the end of the leaf spring which reduce the length of the flexible portion of the spring also during recoil of spring.

Another object of the invention is to provide a resilient suspension on leaf springs for vehicles, in which the spring ends are arranged in cases having upper and lower convex surfaces diverging towards the midde portion of the spring.

Another object of the invention is to provide a resilient suspension on leaf springs for vehicles of the type hereinbefore specified, in which the lower wall of the case containing the spring end between rubber blocks is lid-shaped and is hooked at one end to its case, the other end being pressed by adjustable pressure means against the adjacent block by means of a conical cotter or eccentric connection.

A further object of the invention is to provide a leaf spring suspension of the type hereinbefore specified, in which the above mentioned eccentric is automatically operated under pressure of a spring.

A further object of the invention is to provide a leaf spring suspension for vehicles, of the type hereinbefore specified, in which the spring ends are contained in cases articulated at their flared open end to the vehicle frame and held between springs under an adjustable tension at their other end.

A further object of the invention is to provide a leaf spring suspension for vehicles, of the type hereinbefore specified, in which the rubber block faces co-operating with the spring ends are lined with metallic surfaces in order to avoid sliding of the metal on the rubber and rapid wear of this latter, and means can be provided for an efficient lubrication between the metallic surfaces in relative motion.

Another object of the invention is to provide a leaf spring suspension of the type hereinbefore specified, more particularly for the back axle of a self-propelled vehicle, in which the ends of the leaf spring and the co-operating rubber blocks are kept from sliding with respect to each other, so that lubrication becomes superfluous, by connecting said ends with the rubber blocks, so that stretching of the spring is allowed during flexure by the longitudinal deformation of the rubber blocks, that are made in this case of a thickness such that it permits a considerable inclination of the rubber fibers in the direction of the displacement of the spring.

In this case I prevent crushing of the rubber blocks by arranging through same metal bars that follow the inclinations of the rubber fibers during the vibrations of the spring.

The above and other objects are attained by the novel construction and arrangement of parts hereinafter particularly described and claimed.

Reference is to be had to the accompanying drawings forming a part of this specification, it being understood that the drawings are merely illustrative of one example of the invention.

Figure 1:
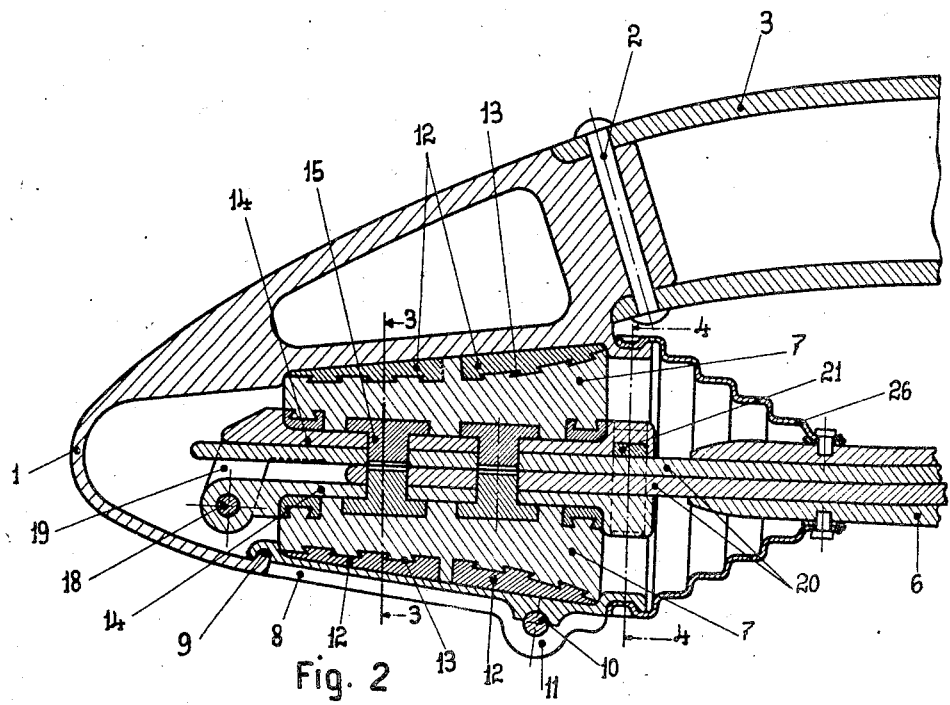
Figure 1 shows, in longitudinal section, a case with rubber blocks for supporting the front end of a fore leaf spring for self-propelled vehicle, in which metallic linings are employed as a protection against wear and tear of the rubber.

Referring to the drawing, more particularly to Figures 1 to 4, showing the attachment of both ends of a fore leaf spring to the vehicle frame, 1 denotes the front case integral with the spring carrier arm, rigidly fixed by riveting 2 to the longitudinal bearer 3 of the frame of a self-propelled vehicle. 4 denotes the back case rigidly fixed to the longitudinal bearer 3 through screws 5. These cases serve as a guide by their side walls for keeping the spring in its plane of oscillation, suitable adjusting means being at will interposed therethrough.

The upper and lower wall of the cases 1 and 4 are inclined, their flared portions being turned towards the middle portion of the leaf spring 6. Within said cases are lodged the ends of the leaf spring clamped between rubber blocks 7. In order to allow mounting of the spring, the lower walls 8 of the cases 1 and 2 are detachable and hooked at one end to the case at 9 and supported at their opposite end in the desired position by cross cotters 10 arranged on ears 11 of the side walls of the cases.

The rubber blocks 7 are lined on their outer face with metal plates 12 resting on seats provided in the upper wall and lid 8 of the case, respectively, and of which the surface contacting with the rubber is curved in such manner that the bearing surface of the spring ends gradually increases as the stresses on the springs in either direction increase. It is clear that the plates 12 can be done away with, the resilient blocks 7 resting directly on the case walls.

The resilient blocks 7 serve for damping the slight vibrations due to unevenness of the road, while the curved surfaces of the plates or the lower and upper case walls permit the spring to suit automatically the stresses which it undergoes by reducing the spring camber and thereby its flexibility as the stresses increase.

The plates 12 can be fixed to the resilient blocks 7 by a dovetail joint 13, as shown, or by any other suitable means.

Figure 2:
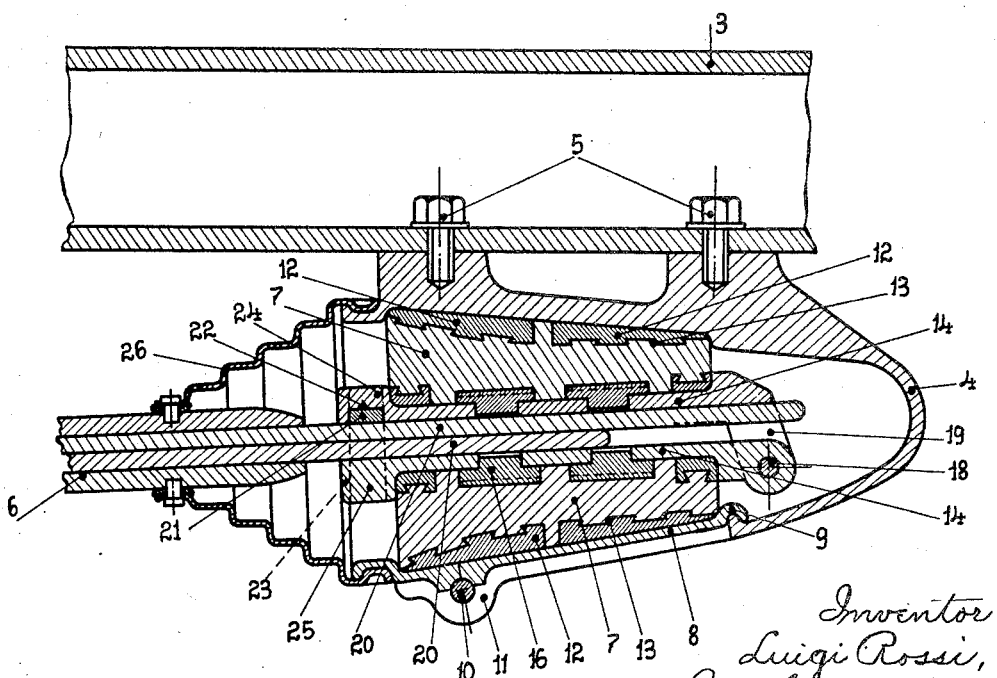
Figure 2 is a view similar to Figure 1 of a case with rubber blocks for supporting the rear end of said fore spring.
Figure 3:
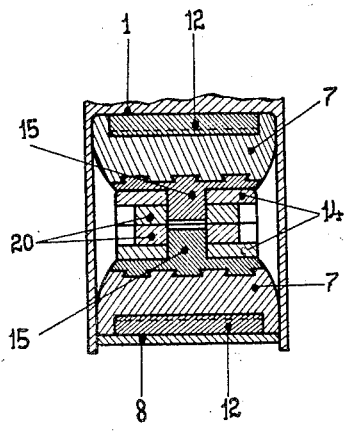
Figure 3 is a section on line 3—3 of Figure 1.
Figure 4:
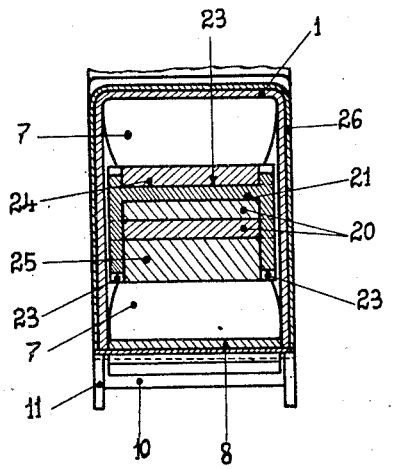
Figure 4 is a section on line 4—4 of Figure 1.

The resilient blocks 7 carry on their inner side knobs for anchoring the metallic sliding surfaces 14, between which are held the ends of the leaf spring. In case the leaf spring is also intended for supporting thrust, as in the example shown, one of its ends is also anchored to the knobs 15 (Fig. 1) which are made longer so as to enter also the plates of the leaf spring, the knobs 16 at the other end engaging only the metallic sliding surfaces (Figure 2).

As the rubber under deformation would become loose from the metallic surfaces 12 and knobs 15 and 16 to which it is connected by a dovetail joint, I harden the rubber in close proximity to said members either directly, or by interposing between the rubber and metal some ebonite that I then vulcanize together with the rubber according to known methods. In the case ebonite can replace also the surfaces 12. The two sliding surfaces 14 are hinged together at 18, the upper surface having bent ears 9 carrying the hinge pin 18. The end 20 of the leaf spring that is made slightly narrower for space reasons passes through said ears, that together with the strap 21 held in grooves 22 and 23 of extensions 24 and 25, respectively, of the sliding surfaces 14, prevents displacement of the spring out of the resilient blocks, which permit, however, by their deformation the lateral oscillations. The sliding surfaces can be efficiently lubricated by using grease or thick oil contained in the cases 1 and 4 that are closed on the side entered by the leaf spring by bellows of leather or other suitable material 26, secured in any way on one side to a groove of the case and on the other side to the spring.

The above described device is more particularly suitable for attachment of the ends of the fore leaf spring of a self-propelled vehicle to the frame.

Figure 5:
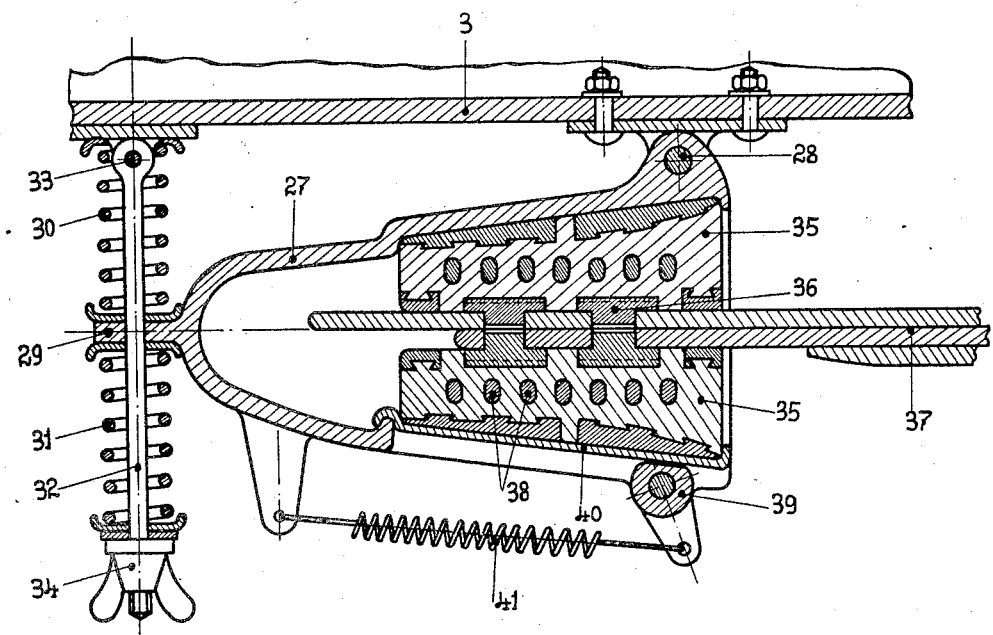
Figure 5 shows, in longitudinal section, a supporting case suitable for both ends of the rear leaf spring of a self-propelled vehicle, in which the spring ends are fast with the rubber blocks.

The arrangement shown in Figure 5 has been found more convenient for the rear leaf springs. In this case the case 27 is hinged at 28 to the longitudinal frame member 3 and is provided at its closed end with an eye 29 held between two opposing springs 30 and 31 fitted into a rod 32 traversing the eye 29 and pivoted at 33 to the longitudinal member. The end of the rod 32 is screw-threaded and on same is screwed a nut 34 by which it is possible to adjust the initial pressure of said springs.

This case construction is also advisable for heavy vehicles, as lorries, motor busses, etc., the springs of which are very stiff so that it is useful to have the case suit the ends of the springs. In the case 27 are arranged the resilient blocks 35 to which is secured by means of the knobs 36 the end of the spring 37, thus dispensing with the metallic sliding surfaces according to the previous constructions. By this arrangement when the leaf spring vibrates, the fibers of the elastic material constituting the blocks, undergo longitudinal deformations and are inclined from the right to the left or vice versa. In order to permit a sufficient deformation I make the blocks of a substantial thickness and to avoid crushing of same which would objectionably reduce them in thickness, the blocks are traversed by metal bars 38 or other bars of non-compressible material. The vibrations of the leaf spring do not produce in the case 27 either sliding or friction, so that lubrication is superfluous.

The lower resilient block 35 is kept pressed against the spring end automatically by an eccentric 39 acting on the lid 40 and pressed by a spring 41 that tends to rotate it in order to press the block against the spring end. This arrangement is made necessary by the fact that the rear springs are more heavily loaded and it is particularly convenient for such vehicles as lorries, motor buses, in which the constant load varies within wide limits.

What I claim is:

1. In a vehicle the combination with a suspension leaf spring, of a supporting case for each end of said leaf spring having the upper and lower walls flared towards the middle portion of the spring, blocks of elastic material interposed between said walls and the spring end and metallic plates interposed between the blocks of elastic material and said walls and having convex diverging surfaces towards the middle portion of the spring.

2. In a vehicle the combination with a suspension leaf spring, of a case for supporting each end of said spring having its upper and lower walls flared towards the middle portion of the spring, the lower wall consisting of a detachable lid hooked at one end to the case and an eccentric for pressing its other end against the spring end.

3. In a vehicle the combination with a suspension leaf spring, of a case for supporting each end of said spring having its upper and lower walls flared towards the middle portion of the spring, the lower wall consisting of a detachable lid hooked at one end to the case and an eccentric for pressing its other end against the spring end and a spring urged device for operating automatically said eccentric as the stresses on the spring increase.

4. In a vehicle the combination with a suspension leaf spring, of a supporting case for each end of said spring having its upper and lower walls flared towards the middle portion of the spring, the lower wall consisting of a lid hooked at one end to the case, an eccentric for pressing the other end of said lid towards the spring end, a spring device for automatically operating the eccentric as the stresses on the spring increase, blocks of elastic material interposed between the upper wall and the case cover, respectively, and the spring end, metallic plates interposed between said blocks of elastic material and the wall and case lid, respectively, the surfaces whereof adjacent to the rubber blocks being convex and diverging towards the middle portion of the spring, said plates being fastened to the rubber blocks.

5. In a vehicle the combination with a suspension leaf spring, of a supporting case for each end of said spring having its upper and lower walls flared towards the middle portion of the spring, the lower wall consisting of a lid hooked at one end to the case, an eccentric for pressing the other end of said lid towards the spring end, a spring device for automatically operating the eccentric as the stresses on the spring increase, blocks of elastic material interposed between the upper wall and the case cover respectively, and the spring end, metallic plates interposed between said blocks of elastic material and the case wall and lid, respectively, the surfaces whereof adjacent to the rubber blocks being convex and diverging towards the middle portion of the spring, said plates being fastened to the rubber blocks, sliding plates interposed between said blocks of elastic material and the spring end, knobs for fastening said plates to said blocks and means in said plates for laterally guiding the spring end.

6. In a vehicle the combination with the vehicle frame and a suspension leaf spring, of a supporting case for each end of said spring having above and under said end bearing surfaces flared towards the middle portion of the spring, so as to automatically reduce the length of the flexible portion of the spring as the vibrations of the spring increase, said case being hinged to the frame at its open end and adjustable springs supported from the frame between which the other end of said case is held.

7. In a vehicle the combination with the vehicle frame and a rear suspension spring, of a supporting case for each end of said spring having above and under said end convex bearing surfaces diverging towards the middle portion of the spring, blocks of elastic material between said bearing surfaces and the spring end, said blocks being lodged in recesses on the case and fixed to said spring end so as to become deformed in the longitudinal direction during the vibrations of the spring.

8. In a vehicle the combination with the vehicle frame and a rear suspension spring, of a supporting case for each end of said spring having above and under said end convex bearing surfaces diverging towards the middle portion of the spring, blocks of elastic material between said bearing surfaces and the spring end, said blocks being lodged in recesses on the case and fixed to said spring end so as to become deformed in the longitudinal direction during the vibrations of the spring and non-compressible metal bars arranged transversely in said blocks in order to avoid an excessive crushing of the elastic material constituting the blocks.

9. In a vehicle the combination with the vehicle frame and a rear suspension spring, of a supporting case for each end of said spring having above and under said end convex bearing surfaces diverging towards the middle portion of the spring, blocks of elastic material between said bearing surfaces and the spring end, said blocks being lodged in recesses on the case and fixed to said spring end so as to become deformed in the longitudinal direction during the vibrations of the spring and non-compressible metal bars arranged transversely in said blocks in order to avoid an excessive crushing of the elastic material constituting the blocks, means for hinging said case at its open end and adjustable springs supported from the frame between which the other end of said case is held.

In testimony that I claim the foregoing as my invention, I have signed my name.

LUIGI ROSSI.